Feb. 11, 1930.                K. R. CRANDALL                1,747,055
                               BAKING DEVICE
                             Filed Aug. 6, 1928

Inventor
Katherine R. Crandall
By Thomas Relyea
Attorney

Patented Feb. 11, 1930

1,747,055

UNITED STATES PATENT OFFICE

KATHERINE R. CRANDALL, OF PORTLAND, OREGON

BAKING DEVICE

Application filed August 6, 1928. Serial No. 297,859.

The primary purpose and object of my device is for the purpose of forming a uniform edge around the pie or other article to be baked, and consists in preferred embodiment of a frustacone made of nonrustable steel or other metallic element and having an outwardly extending peripheral ledge disposed at one of the terminal edges of the frustacone, indentations may be formed at intervals about the surface to aid in maintaining frictional engagement between the frustacone and the pie tin or other baking element. Means may be further provided for maintaining engagement between the frustacone and the baking tin.

A further object of my new and improved device consists in a device that prevents the escapement of the juices from the article being baked during the baking process.

A still further object of my device consists in the forming of a wall that upwardly extends above the rim of the baking device that to all intents and purposes form a seal between the crust of the element being baked, the baking tin and the frustacone wall, and at the same time maintaining an intimate contact between the baking element and the frustacone wall.

A still further object of my device consists in providing a simple seal that upwardly extends from the surface of baking tins and the like that saves time in the sealing of the crust and at the same time prevents the escapement of the juices from the article being baked.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

1 is a baking tin, as a pie pan, having an outwardly extending rim or ledge 2 disposed at its upper edge to stiffen and strengthen the same. I have here shown the baking tin to be circular in form but I do not wish to be limited to a baking utensil of this shape, as my new and improved device may be equally well adapted to baking utensils that are square, or oblong in form, or of other conventional shapes and designs. I preferably form my device of a body element 3, as a frustacone and form an outwardly extending rim or ledge 4, along one of the terminal edges of the device. The purpose and object of making the same in the form or shape of a frustacone, or uniformly tapering side walls is to facilitate the adaptation of the device to baking utensils of substantially the same size, but which are not made on precision tools and therefore are not uniform as to precise measurements. Different makers also may make utensils of the same rated capacity of greater or less actual capacity.

Figure 1:
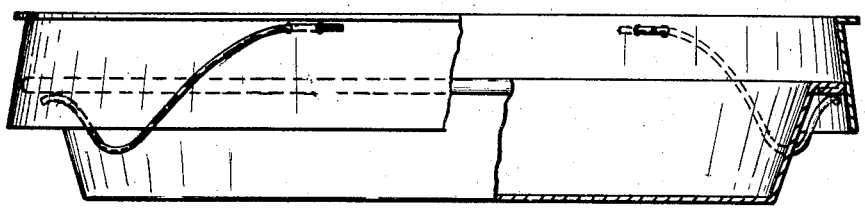
Fig. 1 is a side elevation, partially in section of one of my new and improved devices shown in place upon a pie pan.
Figure 2:
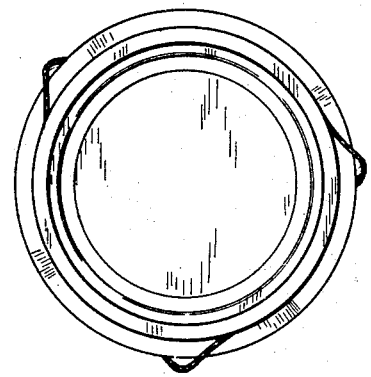
Fig. 2 is a top, plan view, of the mechanism shown in Fig. 1.
Figure 3:
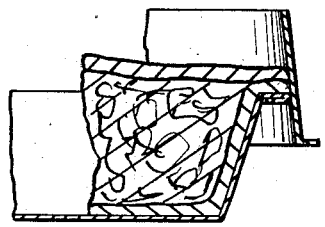
Fig. 3 is a fragmentary, sectional, side elevation of the rim portion of a pie pan showing one of my new and improved devices in place thereupon, illustrating the crust on the article being baked cut flush with the inner surface of one of my devices.
Figure 4:
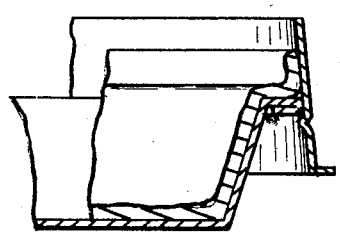
Fig. 4 is a fragmentary, side elevation, of one of my new and improved devices shown in place upon a baking dish showing the crust upward extending along the inner surface of the device. This prevents the leaking of the juices from the element being baked.
Figure 5:
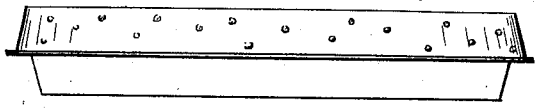
Fig. 5 is a side elevation of the device.

In baking I have found that where the oven is in a highly heated condition and in certain kinds of filler there is a tendency for the juices to boil over and to otherwise escape during the baking operation thereby lessening the savory and food value of the article being baked. To prevent this tendency is the primary purpose and object of my device. When I am baking fruit pies and the like I place one of my devices in place about the baking utensil and place the bottom crust 5 therein and extend the same upward above the top of the rim 6 of the baking utensil and engage the inner surface of the frustacone, as shown at 7 in Fig. 4. After the filler has been placed therein a top crust may then be placed over the filler and the article be baked without fear of the juices escaping from the crust. To maintain the frustacone in intimate contact with the baking utensil indentations 8 are formed within the body portion of the device. The pressing down of the device upon the baking utensil causes a frictional engagement between the engaging surfaces that prevents the dislodgment of the device from the utensil during the baking operation.

In certain other operations I have found that better results obtain wherein a flexible and somewhat elastic connection is provided between the device and the baking utensil. This may be accomplished by the placing of a flexible fastening, as a wire 9, that is secured to the outer surface of the frustacone and the free end 10 of the device be so provided in length and shape to engage the underside of the rim of the lid.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:

1. In a device of the class described, in combination with a baking element, of a frustacone having indentations disposed in its surface to maintain frictional engagement between the baking element and the frustacone and an outwardly extending peripheral ledge disposed at one of the terminal edges of the frustacone.

2. In a device of the class described, in combination with a pie tin, of a frustacone element having uniformly tapering walls, said walls being so formed as to form a frictional engagement with the outer peripheral edge of a baking tin, and a flexible connection element secured to the outer surface of the frustacone element, its free end being adapted to engage with the underside of the rim of the baking tin.

KATHERINE R. CRANDALL.